United States Patent [19]

Kaganowicz et al.

[11] Patent Number: 5,013,139

[45] Date of Patent: May 7, 1991

[54] ALIGNMENT LAYER FOR LIQUID CRYSTAL DEVICES AND METHOD OF FORMING

[75] Inventors: Grezgorz Kaganowicz, Belle Mead; Frank P. Cuomo; Leon J. Vieland, both of Princeton, all of N.J.

[73] Assignee: General Electric Company, Princeton, N.J.

[21] Appl. No.: 428,693

[22] Filed: Oct. 30, 1989

[51] Int. Cl.⁵ .................................. G02F 1/13
[52] U.S. Cl. ............................ 350/340; 350/341; 350/350 S; 427/39; 427/41; 427/109; 204/192.15; 204/192.12
[58] Field of Search ............... 350/340, 341, 350 S; 427/39, 40, 41, 109, 124, 166; 430/20; 204/192.12, 192.15, 192.14, 192.29

[56] References Cited

U.S. PATENT DOCUMENTS

| | | | |
|---|---|---|---|
| 4,013,463 | 3/1977 | Leder | 427/38 |
| 4,146,656 | 3/1979 | Kinugawa et al. | 427/109 |
| 4,402,999 | 9/1983 | Tasumichi et al. | 427/126.3 |
| 4,405,208 | 9/1983 | Shirai | 350/341 |
| 4,419,382 | 12/1983 | Sliemers et al. | 427/41 |
| 4,421,843 | 12/1983 | Hattori et al. | 427/41 |
| 4,437,731 | 3/1984 | Sudo et al. | 350/340 |
| 4,634,228 | 1/1987 | Iwasaki et al. | 350/341 |
| 4,643,531 | 2/1987 | Inoue | 350/341 |
| 4,674,842 | 6/1987 | Van de Venne | 350/340 |
| 4,705,359 | 11/1987 | Amstutz et al. | 350/341 |
| 4,723,839 | 2/1988 | Nakanowatari et al. | 350/341 |
| 4,759,614 | 7/1988 | Yokohura et al. | 350/341 |
| 4,766,477 | 8/1988 | Nakagawa et al. | 357/59 E |
| 4,830,873 | 5/1989 | Benz et al. | 427/35 |
| 4,844,588 | 7/1989 | Yamazaki et al. | 350/339 R |
| 4,850,680 | 7/1989 | Yamazaki et al. | 350/341 |
| 4,902,106 | 2/1990 | Dijon et al. | 350/341 |
| 4,932,757 | 6/1990 | Hangu et al. | 350/341 |

FOREIGN PATENT DOCUMENTS 61-165730  7/1986  Japan .................................. 350/340

Primary Examiner—Rolf Hille
Assistant Examiner—Minhloan Tran
Attorney, Agent, or Firm—J. S. Tripoli; D. H. Irlbeck; L. L. Hallacher

[57] ABSTRACT

An alignment layer for a liquid crystal display device provides optimum molecular alignment, tilt angle and resistivity by depositing a glow discharge layer comprised of carbon, nitrogen, and hydrogen onto the electrodes of the liquid crystal cell.

6 Claims, 1 Drawing Sheet

ALIGNMENT LAYER FOR LIQUID CRYSTAL DEVICES AND METHOD OF FORMING

BACKGROUND

This invention relates generally to liquid crystal devices and particularly to an alignment layer for such devices, and to a method of forming such layers.

Display devices which utilize twisted nematic liquid crystals include a liquid crystal material disposed between two insulative substrates, at least one of which is transparent. Electrical control electrodes are disposed on the surfaces of the substrates which face the liquid crystal material. In one type of liquid crystal device both the substrates and their associated electrodes are transparent to permit light to pass through the entire structure when the elongated molecules of the liquid crystal material are in one orientation, or to be opaque to light for another orientation of the liquid crystal molecules. In another type of liquid crystal device only one substrate and its associated electrode are transparent. In this type of device, light passes through the substrate and is reflected off the liquid crystal material for one state of the liquid crystal material. For another state of the liquid crystal material, light passes through the liquid crystal material and is reflected from the other substrate For both types of devices images are formed by voltage biasing the control electrodes of selected cells to change the light transmission capabilities of the energized cells.

In both types of liquid crystal devices the molecules of the liquid crystal material are elongated and must be properly aligned with the surfaces of the substrates in order to assure uniformity of operation and high contrast of the displayed information. The required alignment of the liquid crystal molecules is achieved by coating the surfaces of the electrodes with an alignment material and rubbing the alignment material in the direction desired for the alignment of the molecules.

In active matrix liquid crystal display devices a switching device, such as a thin film transistor (TFT) or a solid state diode, is associated with each of the liquid crystal elements within the display. The alignment layer for active matrix liquid crystal devices must control three properties to provide optimum operation and contrast. The properties are the tilt angle between the principal axis of the molecules and the substrate, molecular alignment (parallel orientation of the liquid crystal molecules), and a high RC time constant. The tilt angle should be between 1° and 5° to provide a suitable response time and to optimize the viewability of the device. Good molecular alignment of the liquid crystal molecules is necessary to provide uniformity of operation and high contrast between the energized and deenergized states. A high RC time constant is needed because the resistivity of the liquid crystal material must be sufficiently high to assure that the liquid crystal cells are capable of storing a charge for a time period of sufficient duration to display the desired image. It is desirable for the RC time constant to be in excess of 100 msec, it is also desirable that the time constant does not change during life of the display device.

In directly driven liquid crystal devices, i.e. those which do not employ solid state switching devices, the alignment layer must control only the tilt angle and the alignment of the liquid crystal molecules. The time constant, or resistivity, of the liquid crystal material is of no concern, because the liquid crystal cells are not called upon to store a charge during the display of information. Accordingly, the alignment layer for directly driven display devices frequently is polyimide. The polyimide provides excellent molecular alignment and a desirable tilt angle within the range of 1.5° to 3°. Initially, the time constant of a cell having a polyimide alignment layer is 30 to 100 msec. Upon exposure to elevated temperatures, in the order of 90° C., the time constant degrades to 10 to 30 msec. A time constant of this duration is unacceptable for active matrix liquid crystal displays. Also, polyimide alignment material frequently degrades the resistivity of commonly used liquid crystal materials and, therefore, is unsuitable as an alignment layer in active matrix liquid crystal devices. Other materials, which do not adversely effect the resistivity of the liquid crystal material, typically demonstrate either poor molecular alignment or inadequate tilt angle and, therefore, also are not useful as alignment materials for active matrix liquid crystal devices. For example, when angle evaporated $SiO_2$ is used as the alignment material the tilt angle is difficult to control because the deposition is not easily repeatable.

For these reasons there is a need for an alignment layer for active matrix liquid crystal devices which provides acceptable tilt angle, good alignment of the liquid crystal molecules and a RC time constant suitable for use with active matrix liquid crystal devices. The present invention fulfills these needs.

CROSS REFERENCE TO RELATED APPLICATIONS

U.S. application Ser. No. 428,698 filed on even date herewith by G. Kaganowicz, entiled "Inorganic Alignment Layer For Liquid Crystal Devices And Method Of Forming", describes technology related to that described herein.

U.S. application Ser. No. 428,696 filed on even date herewith by G. Kaganowicz and J. W. Robinson, entitled "Method Of Making Liquid Crystal Devices With Improved Time Constant" describes technology related to that described herein.

U.S. application Ser. No. 428,694 filed on even date herewith by G. Kaganowicz and J. W. Robinson entitled "Method Of Making Liquid Crystal Devices With Improved Adherence" describes technology related to that described herein.

The teachings of these applications are incorporated herein by reference.

SUMMARY

A liquid crystal device having a liquid crystal material disposed between parallel substrates and having electrodes arranged on the surfaces of the substrates adjacent to the liquid crystal material, includes an improved alignment layer which is made by glow discharge deposition onto the electrodes and which is comprised of a percentage of nitrogen falling within a first range, a percentage of carbon falling within a second range, and the balance hydrogen.

DETAILED DESCRIPTION

Figure 1:
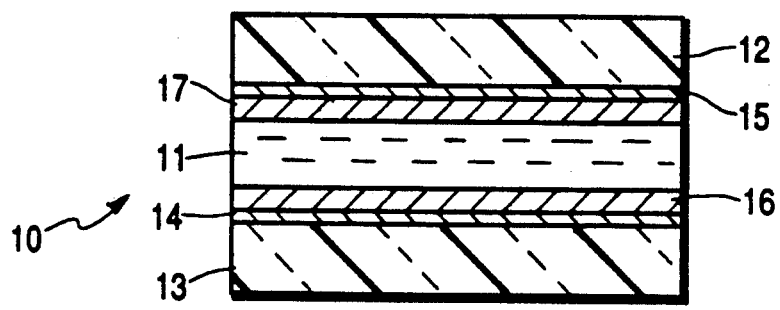
FIG. 1 is a simplified cross section of a preferred embodiment.

In FIG. 1, a liquid crystal device 10 includes a liquid crystal material 11 disposed between two transparent insulative substrates 12 and 13. A transparent electrode 14 is disposed on the surface of the substrate 13 which faces the liquid crystal material 11. A transparent electrode 15 is provided on the surface of the substrate 12 which faces the liquid crystal material 11. Any solid state switching devices, such as TFT's or MIM's, which are required for an active matrix display device are not shown. However, the space needed for the solid state switching devices typically is provided by omitting a small corner of the electrode 14, and fabricating the solid state switching device in the space thus provided using solid state manufacturing techniques, which are known to those skilled in the art. An alignment layer 16, which provides good molecular alignment, optimum resistivity and good tilt angle, is deposited over the transparent electrode 14. Similarly, an alignment layer 17, which also provides good molecular alignment, optimum resistivity and good tilt angle, is deposited over the transparent electrode 15 of the substrate 12.

The alignment layers 16 and 17 are applied to the transparent conductive electrodes 14 and 15 utilizing glow discharge processes, which are well known in the art. The use of glow discharge processes results in highly cross linked molecules of the alignment material, which is very desirable for providing the desired molecular alignment and tilt angle. Preferably the glow discharge process is magnetically enhanced. The glow discharge process is carried out utilizing a hydrocarbon as a source of hydrogen and carbon, and nitrogen as a source of nitrogen. The resulting alignment layer contains 1 to 10% nitrogen, 40 to 85% of carbon and the balance is hydrogen. It has been found that the utilization of this material causes no significant degradation of the liquid crystal material resistivity even upon extended life test. The invention is advantageous because optimum molecular alignment, tilt angle and resistivity are obtained in a one step process having repeatability which is acceptable for volume production.

The transparent electrodes 14 and 15 preferably are made of indium tin oxide (ITO) and adhere well to the substrates 12 and 13. It is also important for the alignment layers 16 and 17 to adhere to the ITO's 14 and 15. The adherence between the ITO's and alignment layers can be significantly enhanced by coating the ITO's with polyimide prior to depositing the alignment layers 16 and 17 onto the structure.

Figure 2:
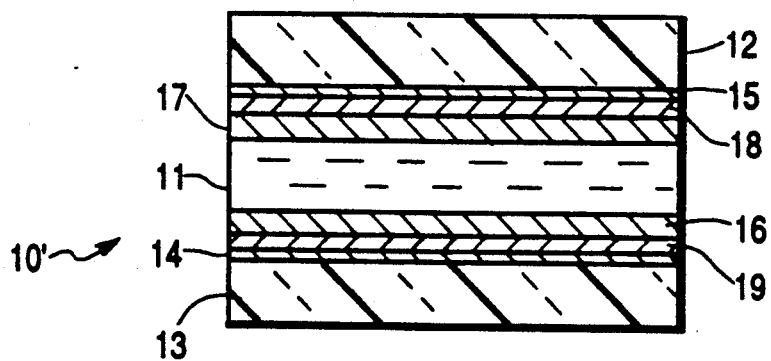
FIG. 2 is a simplified cross section of a second preferred embodiment.

In FIG. 2, the liquid crystal display device 10' is similar to that of FIG. 1 as indicated by the like reference numbers. However, in FIG. 2 a polyimide layer 18 is present between the electrode 15 and the alignment layer 17. Similarly, polyimide layer 19 is present between the electrode 14 and the alignment layer 16. Methods of applying the polyimide layers 18 and 19 are well known in the liquid crystal art.

EXAMPLE 1

A liquid crystal cell substrate coated with polyimide was placed into a glow discharge system on a plate 1" away from electrode. The system was evacuated to $10^5$ torr and 24 sccm of acetylene and 3 sccm of nitrogen were introduced into the system to a pressure of $20\mu$. 100 W of 13.56 MHz power was applied for 60 seconds to form a 350 A coating on the substrate. The coating passed the scotch tape adhesion test. The nitrogen content of the coating was 7% (AES).

EXAMPLE 2

A liquid crystal cell substrate was coated as in example 1 except that substrate was without the polyimide coating. The coating failed the scotch tape adhesion test.

Cells from both examples were assembled. Cells prepared as in example 1 had initial good alignment and time constant of about 1.5 sec. After 4 weeks in 90% relative humidity at 90° C., the time constant was 2.4 sec and alignment was without change.

Cells made as in example 2 had an initial time constant of 1.2 sec however they appeared blotchy which is characteristic of coatings with poor adhesion.

What is claimed is:

1. In a liquid crystal device having a liquid crystal material disposed between first and second substrates and electrodes arranged on the surfaces of said substrates adjacent to said liquid crystal material, an improvement comprising:
   alignment layers deposited by glow discharge onto said electrodes and comprised of a percentage of nitrogen falling within a range of 1 to 10% percentage, a percentage of carbon falling within a range of 40 to 85% percentage, and a percentage of hydrogen needed to bring the total percentage to 100%.

2. The liquid crystal device of claim 1 further including polyimide layers between said electrodes and said alignment layers.

3. A method of forming alignment layers for liquid crystal materials on the control electrodes of a liquid crystal display device comprising the steps of:
   depositing by glow discharge a material comprised of a percentage of nitrogen falling within a range of 1 to 10% percentage, a percentage of carbon falling within a range of 40 to 85% percentage and a percentage of hydrogen necessary to bring the total percentage of 100%, onto said electrodes; and
   rubbing said layer in a direction desired for molecular alignment of the molecules of said liquid crystal material.

4. The method of claim 3 further including the step of magnetically enhancing said glow discharging.

5. The method of claim 3 further including the step of applying a layer of polyimide to said electrodes prior to depositing said material onto said electrodes.

6. The method of claim 4 further including the step of applying a layer of polyimide to said electrodes prior to depositing said material onto said electrodes.

* * * * *